United States Patent
Nadejde et al.

(10) Patent No.: US 12,299,389 B2
(45) Date of Patent: *May 13, 2025

(54) PROFICIENCY AND NATIVE LANGUAGE-ADAPTED GRAMMATICAL ERROR CORRECTION

(71) Applicant: Grammarly, Inc., San Francisco, CA (US)

(72) Inventors: Maria Nadejde, Brooklyn, NY (US); Joel Tetreault, New York, NY (US)

(73) Assignee: Grammarly Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,741

(22) Filed: Dec. 7, 2023

(65) Prior Publication Data

US 2024/0104301 A1    Mar. 28, 2024

Related U.S. Application Data

(63) Continuation of application No. 16/807,123, filed on Mar. 2, 2020, now Pat. No. 11,886,812.

(51) Int. Cl.
*G06F 40/253* (2020.01)
*G06F 9/451* (2018.01)
(Continued)

(52) U.S. Cl.
CPC .......... *G06F 40/253* (2020.01); *G06F 40/232* (2020.01); *G06F 40/263* (2020.01);
(Continued)

(58) Field of Classification Search
CPC .... G06F 40/253; G06F 40/232; G06F 40/263; G06F 9/451; G06N 3/0445; G06N 3/08
See application file for complete search history.

(56) References Cited

U.S. PATENT DOCUMENTS 9,342,499 B2    5/2016    Madnani et al.
10,153,937 B1 *  12/2018  Marr .................. H04L 41/0631
(Continued)

FOREIGN PATENT DOCUMENTS

WO        2019024050 A1    2/2019

OTHER PUBLICATIONS

Rozovskaya et al.,"Building a State-of-the-Art Grammatical Error Correction System", Transactions of the Association for Computational Linguistics, dated Oct. 2014, 16 pages.
(Continued)

*Primary Examiner* — Michael N Opsasnick
(74) *Attorney, Agent, or Firm* — Van Hoven PC; Jordan Becker

(57) ABSTRACT

In an embodiment, the disclosed technologies are capable of receiving, by a digital model, data representing a first text sequence in a first language; using the digital model, modifying the first text sequence to result in creating and digitally storing a second text sequence in the first language; and outputting, by the digital model, the second text sequence in the first language. The modifying may include any one or more of: deleting text from the first text sequence, adding text to the first text sequence, modifying text of the first text sequence, reordering text of the first text sequence, adding a digital markup to the first text sequence. The digital model may have been fine-tuned, after having been machine-learned, using a subset of values of model parameters associated with an encoding layer or an embedding layer or both the encoding layer and the embedding layer.

20 Claims, 6 Drawing Sheets

(51) Int. Cl.
    *G06F 40/232* (2020.01)
    *G06F 40/263* (2020.01)
    *G06N 3/044* (2023.01)
    *G06N 3/08* (2023.01)
(52) U.S. Cl.
    CPC .............. *G06N 3/044* (2023.01); *G06N 3/08* (2013.01); *G06F 9/451* (2018.02)

(56) References Cited

U.S. PATENT DOCUMENTS

| | | | |
|---|---|---|---|
| 10,387,565 B2 | 8/2019 | Hoover et al. | |
| 2015/0127325 A1* | 5/2015 | Birnbaum | G06F 40/211 704/9 |
| 2015/0309982 A1* | 10/2015 | Lee | G06N 5/04 704/9 |
| 2017/0221472 A1* | 8/2017 | Sharifi | G10L 13/08 |
| 2018/0121496 A1* | 5/2018 | Hayes | G06F 16/9535 |
| 2018/0121807 A1* | 5/2018 | Wick | G06N 5/01 |
| 2018/0336884 A1* | 11/2018 | Sriram | G06N 3/044 |
| 2019/0347540 A1* | 11/2019 | Yim | G06N 20/20 |

OTHER PUBLICATIONS

Rozovskay et al., "Adapting to Learner Errors with Minimal Supervision", dated Jun. 2, 2017, 39 pages.

Nadejde et al., Personalizing Grammatical Error Correction: Adaptation to Proficiency Level and L1, 2019 EMNLP Workshop W-NUT: 5th Workshop on Noisy User-generated Text, Nov. 4, 2019. 7 pages.

Junczys-Dowmunt et al., "Approaching Neural Grammatical Error Correction as a Low-Resource Machine Translation Task", Proceedings of NAACL-HLT 2018, dated Jun. 2018, 12 pages.

http://www.cambridge.org, "The System of Error Codes", Codes by Group, http://www.cambridge.org/sketch/error_system.html, dated Jan. 24, 2020, 2 pages.

Chollampatt et al., "Adapting Grammatical Error Correction Based on the Native Language of Writers with Neural Network Joint Models", dated Nov. 2016, 11 pages.

Cambridge Learner Corpus Error Codes, "Coding System", http://www.cambridge.org/sketch/error_codes.html, dated Jan. 24, 2020, 2 pages.

\* cited by examiner

PROFICIENCY AND NATIVE LANGUAGE-ADAPTED GRAMMATICAL ERROR CORRECTION

CROSS-REFERENCE TO RELATED APPLICATIONS

This application claims the benefit under 35 U.S.C. 120 as a continuation of application Ser. No. 16/807,123, filed Mar. 2, 2020, now U.S. Pat. No. 11,886,812 the entire contents of which are hereby incorporated by reference for all purposes as if fully set forth herein.

TECHNICAL FIELD

One technical field to which this disclosure relates is computer software for grammatical error correction.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Computer software applications for grammatical error correction (GEC) are configured to detect different kinds of errors in text, such as spelling, punctuation, grammatical, and word choice errors. GEC systems may highlight or annotate portions of the text that contain errors. After identifying errors in the text, GEC systems may output a grammatically correct version of the text.

SUMMARY

The appended claims may serve as a summary of the present invention.

Figure 1:
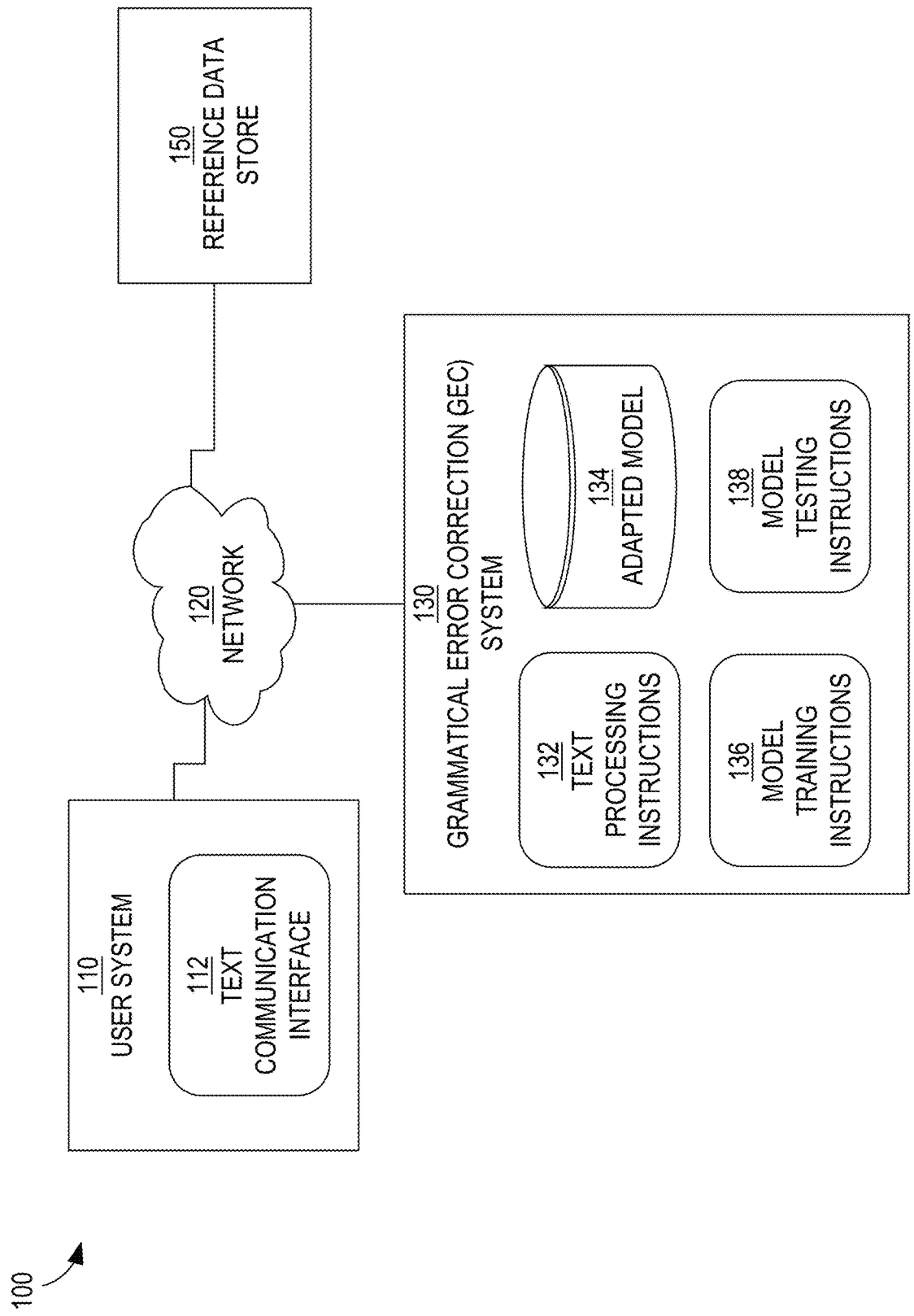
FIG. 1 is a block diagram illustrating at least one embodiment of a computing system in which aspects of the present disclosure may be implemented.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

OVERVIEW

1. Technical Problem

Existing neural network-based GEC systems are generalized and domain-agnostic, so that the most frequently encountered errors across a broad population are identified and corrected. However, the frequency and types of grammatical errors present in text are often heavily influenced by particular characteristics of the source of the text; for example, personal characteristics of an author, speaker, or editor of the text. These particular characteristics can include but are not limited to the native language, also known as the first language, or L1, and/or the proficiency level, of the source of the verbal communication represented by the text. Language as used herein may refer to a system of words that is usable for human-to-human communication, such as Mandarin, German, French, English.

For example, a person writing or speaking in English whose native language is not English may be more likely to incorrectly use a definite article with general purpose nouns or to omit the indefinite article altogether, or to make mistakes with word order or verb tense, resulting in a grammatically incorrect text sequence. For instance, a person who is not a native English speaker might say in English, "we all have to live in the society" instead of "we all have to live in society," or "by any change, do you know where can I find my lunch?" instead of "by any chance, do you know where I can find my lunch?" or "and I did checked fridge under microwaves" instead of "and I did check the fridge under the microwave." Other grammatical errors may be attributed to the absence of a certain linguistic feature in the user's native language. For example, Chinese and Russian speakers and writers may tend to make more errors involving articles, since these languages do not have articles.

Whether a non-native speaker has a high, intermediate, or low proficiency level in the language being spoken further influences the error distribution. For example, a native-native English speaker with a low proficiency level in English might make word order errors, such as, "I must at once my sister telephone" instead of "I must telephone my sister at once."

2. Technical Challenges

It has been a technical challenge for GEC systems to strike an appropriate balance between generalization and particularization of grammatical error correction models. Highly generalized systems are less likely to detect grammatical errors that are more particularly associated with native language or proficiency level of particular users. Highly particularized systems may overlook grammatical errors that are very common in a broader population, for example a population that includes both native English speakers and non-native English speakers of varying proficiency levels. In either case, when the computer does not identify and correct the user's grammatical errors, the GEC system does not perform as expected and its reliability is questioned, leading to decreased use of the system.

3. Technical Solutions that Address Technical Challenges

Embodiments of the disclosed technologies utilize a neural network-based GEC model that has been adapted to both L1 and proficiency level using techniques described in this disclosure. In an embodiment, the disclosed adapted model is created using two training datasets that are of different domains. Initially, all model parameter values are machine-learned using domain-independent training data that includes uncorrected source text sequences (e.g., sentences), which contain grammatical errors, and grammatically corrected versions of the uncorrected source text sequences, where the training data contains a mix of training samples having different L1s and proficiency levels but the training samples are not labeled with the L1 and proficiency levels.

After the initial training, parameter values for only a subset of the model parameters are fine-tuned using in-domain training data that includes uncorrected text sequences that are labeled with the native languages and proficiency levels of the sources of the respective uncorrected text sequences, as well as grammatically corrected versions of the native language and proficiency-labeled uncorrected source text sequences. Although not required, in some implementations, uncorrected text sequence-corrected text sequence pairs in the dataset used for fine tuning may be labeled with corresponding error codes, which may indicate, for a particular text sequence, at least one type of error that is present in the text sequence and the location of the error within the text sequence. In an embodiment, the subset of the model parameters that are fine-tuned includes only the model parameter values for the encoder, for example the embedding and/or encoding layers of the adapted model, while model parameter values for other layers of the adapted model, such as the decoder, are not fine-tuned.

4. Benefits

In experiments, the disclosed technologies have been shown to have improved results when compared to general purpose, domain-agnostic neural network-based GEC models, models adapted by native language alone and over models adapted by proficiency level alone. Evidence of the improved results has been reflected in performance metrics including precision, recall and the $M^2$ metric, as shown in Table 2, discussed below.

System Overview

FIG. 1 illustrates a computing system in which embodiments of the features described in this document can be implemented. In the embodiment of FIG. 1, computing system 100 includes a user system 110, a GEC system 130, and reference data 150.

User system 110 includes at least one computing device, such as a personal computing device, a server, a mobile computing device or a smart appliance. User system 110 includes at least one software application, including a text communication interface 112. Text communication interface 112 obtains or produces digital text sequences that may be analyzed by GEC system 130. Text communication interface 112 enables users and/or automatic processes to provide input of or digitally designate data as text sequences for analysis by GEC system 130.

In an embodiment, text communication interface 112 is any type of user interface including a graphical user interface through which written or typed words may be received as text and/or a voice interface through which spoken words may be received via audio signals containing speech and converted to text by, for example, a speech to text engine such as an automated speech recognition engine. Thus, text communication interface 112 may include at least one text data entry control element and/or at least one voice data entry control element, such as a text entry box or a button, which can receive verbal content which is, or is converted to, a text sequence that is stored in computer memory in digital form. Alternatively or in addition, text communication interface 112 may provide an application program interface (API) that allows executing programs or processes of user system 110 to make text sequences available for processing by GEC system 130.

A digital text sequence can be produced by a computer user typing or speaking words into text communication interface 112. For example, a user may generate a digital text sequence using a text editor, a word processor, an electronic messaging program, a command line interface, or a control element of text communication interface 112. The term user, as used herein, may refer to at least one human person interacting with a computing device, or may refer to an automated process that has been configured to output synthesized speech or natural language text. For instance, a bot, a personal digital assistant, or a robot may be a user, in some embodiments.

In another example, a digital text sequence is created by a computer extracting text from a digital content item, such as a document, a message, a social media posting, a list of search results, a web page, or another source of text stored in digital form. A digital text sequence can also be produced by speech-to-text software transcribing words that have been spoken by a user in the vicinity of a microphone that is operably coupled to user device 110.

GEC system 130 is bi-directionally communicatively coupled to user system 110 and reference data store 150 by network 120, in an embodiment. GEC system 130 executes automated grammatical error correction processes on digital text sequences, including but not limited to digital text sequences received from user system 110. GEC system 130 performs grammatical error correcting using a machine-learned model that has been adapted for both L1 and proficiency level as disclosed herein and described in more detail below.

A client portion of GEC system 130 may operate in user system 110, for example as a plugin or widget in a graphical user interface of a software application or as a web browser executing text communication interface 112. In an embodiment, a web browser may transmit a HTTP request over a network (e.g., the Internet) in response to user input (e.g., entering of a text sequence) that is received through a user interface provided by the web application and displayed through the web browser. A server portion of GEC system 130 may receive the input, perform at least one operation to analyze the input, and return at least one modified version of the input using an HTTP response that the web browser receives and processes.

In the embodiment of FIG. 1, GEC system 130 includes text processing instructions 132, adapted model 134, model training instructions 136 and model testing instructions 138.

Text processing instructions 132 are embodied as computer programming code stored in computer memory that when executed cause a computing device to operate a software-based grammatical error correction service. Text processing instructions 132 are in bidirectional digital communication with adapted model 134 as needed to operate the software-based grammatical error correction service.

In an embodiment, text processing instructions 132 perform any needed pre-processing on input text sequences received from user system 110, provide the pre-processed input text sequences as input to adapted model 134, receive output text sequences output by adapted model 134, perform any needed post processing on the output text sequences output by adapted model 134, and provide the post-processed output text sequences to user system 110 for visual and/or audio presentation to a user via text communication interface 112.

An example of pre-processing that may be performed by a computing device executing text processing instructions 132 on input text sequences is segmenting, by a computing device, of an input text sequence into sub-word units. An example of a sub-word unit is a byte of data. Other examples of sub-word units include phones, triphones, and phonemes, as those terms are used in phonetics and linguistics. For example, a sub-word unit may include text that represents at least one distinct speech sound or gesture.

In an embodiment, adapted model 134 has machine-learned segmentations of input text sequences into sub-word units from unlabeled data using a Byte Pair Encoding (BPE) algorithm. In some embodiments, input text sequences longer than a certain threshold length are truncated. A threshold length may be defined by, for example, a number of sub-units. The threshold length is established in accordance with the requirements of a particular domain; for example, native English or native German, and/or other design or implementation considerations. For instance, if computational efficiency is a priority, the threshold length may be set to a shorter value in order to reduce the computation required for model training. If more time or computational resources are available, the threshold length value may be increased in order to train the model on longer text sequences.

An example of post-processing that may be performed by a computing device executing text processing instructions 132 is adding at least one digital markup to an output text sequence that has been produced by adapted model 134. Examples of digital markups include but are not limited to digital highlighting using various colors, bold, underline, italics, bounding boxes, and/or other forms of visual markup. Digital markups may also or alternatively include, in a voice interface, expressions of emphasis such as increased or decreased pitch, loudness, and/or speaking rate, which may be added to speech output produced by a text-to-speech (TTS) component of the voice interface.

Adapted model 134 is a machine-learned model that has been trained to analyze digital input text sequences and produce digital output text sequences that are grammatically corrected and fluency-adjusted versions of the corresponding digital input sequences, taking into account the user's particular native language and proficiency level. Examples of grammar-based corrections include changing a verb tense and inserting an article. An example of a fluency-based correction is replacing a word with the phonetically-similar semantically correct word, for example "change" to "chance," where the word error may be due to the difference between the phonological system of the speaker's native language and the phonological system of the language in which the speaker has spoken (e.g., English). Another example of a fluency-based correction is changing the word order, such as changing "at once my sister telephone" to "telephone my sister at once," where the word order error may be due to the speaker's native language and proficiency level in the language of the input text. Errors may be grammatical or fluency-based or both, and these categories are not necessarily mutually exclusive.

Figure 4A:
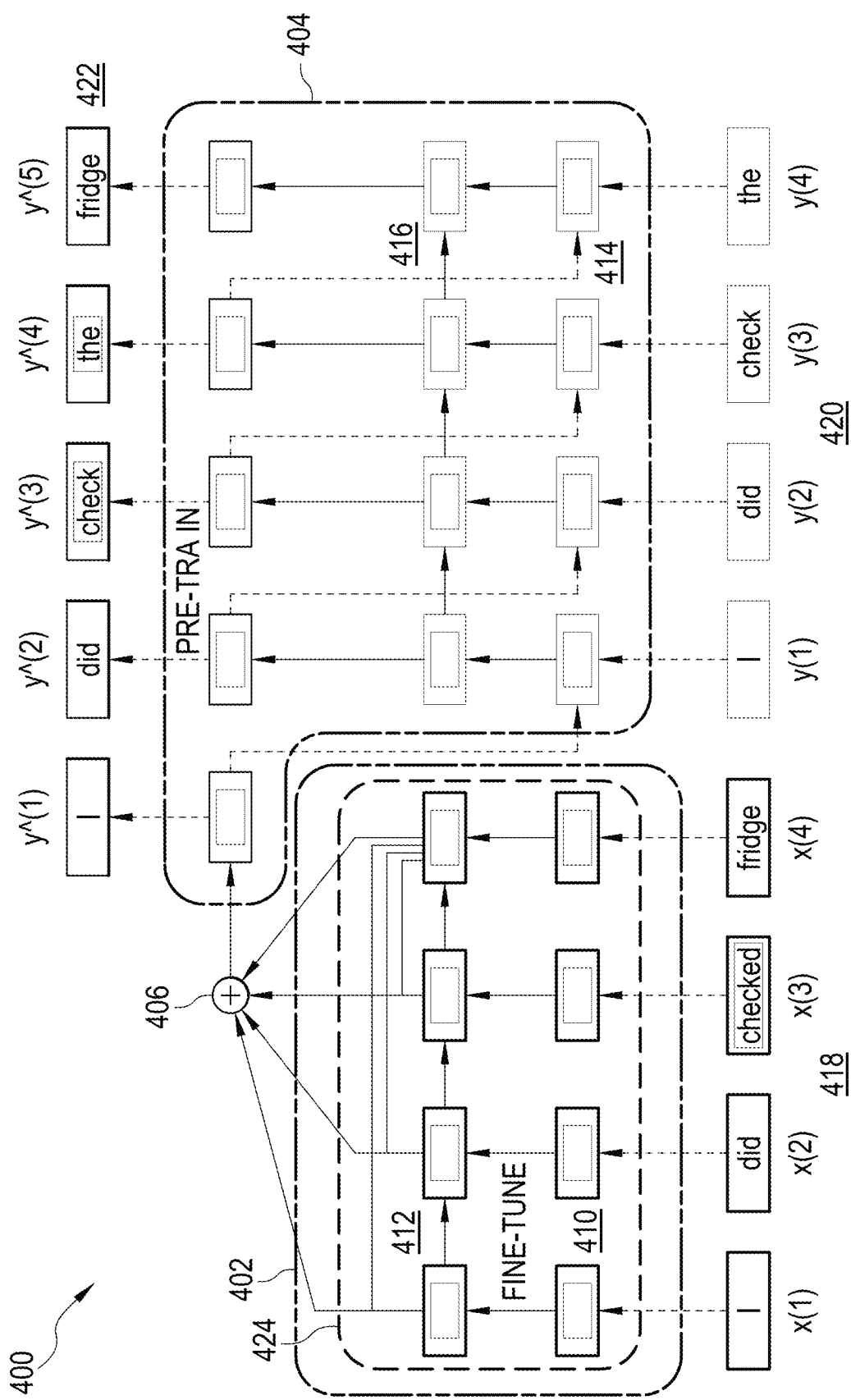
FIG. 4A is a schematic diagram of an embodiment of at least one device of the computing system of FIG. 1.

In an embodiment, adapted model 134 is a recurrent neural network (RNN)-based encoder-decoder neural network with attention and long term short term (LSTM) units. Adapted model 134 takes as input a digital text sequence in a particular language; for example, an English sentence, where the input may contain grammatical errors. Adapted model 134 decodes and outputs a grammatically and fluency-corrected version of the input digital text sequence in the same language as the input; for example, a grammatically and fluency-improved version of the English sentence input. An embodiment of adapted model 134 is shown in FIG. 4A, which is described below.

Model training instructions 136 are embodied as computer programming code stored in computer memory that when executed cause a computing device to perform training of adapted model 134 by causing inputting of particular sets of training data into model 134 at particular times. For example, model training instructions 136 may specify that pre-training on a domain-independent set of training data occurs prior to fine tuning on an in-domain set of training data. Model training instructions 136 may further specify criteria for selecting or creating the in-domain training data set. For example, if the primary native language of sources of input text is expected to be English, text sequences in the in-domain data set may be primarily of native-English sources. However, if the primary native language of the input text is expected to be Spanish, text sequences in the in-domain data set may be primarily of native-Spanish sources. Model training instructions 136 are in bidirectional communication with reference data store 150 to obtain, for example via a query, the various sets of training data that are used by a computing device executing model training instructions 136 to train, test, or tune adapted model 134.

In an embodiment, execution of model training instructions 136 by a computing device causes adapted model 134 to be trained on a first domain-independent data set that includes text sequences obtained from both native and non-native speakers of the language of the text sequences. For example, the first training data set may include a corpus of English language sentences that have been written by a mix of native and non-native English speakers of various native backgrounds, where the sentences are about various topics and written using a variety of different writing styles. The first training data set is considered domain-independent because the text sequences are not labeled according to proficiency level or L1. That is, the text sequences in the first training data set have an unknown distribution of both proficiency level and L1.

In an embodiment, model training instructions 136 also cause only a portion of adapted model 134; that is, less than all of the model parameters, to be trained on a second, in-domain data set that includes text sequences labeled with both proficiency level and L1. Although not required, in some implementations, text sequences also may be labeled according to error code. For example, the second training data set may include examination essays written in English by English language learners of different proficiency levels and different L1s, where the essays have been reviewed, corrected. Although not required, in some implementations, essays used to create the second training data set may be labeled with error codes by at least one ground-truth annotator. Training data used to create the first and second training data sets may be obtained by permission from, for example, Cambridge Learner Corpus (CLC).

Examples of native language (L1) labels include the language name or an abbreviation of the language name, or a code that represents the language name. For example, L1 labels may be implemented as "English," "Spanish," "Mandarin," etc., or "EN," "SP," "MD," or "E1," "S1," "M1," etc. Examples of proficiency labels are the Common European Framework of Reference for Languages (CEFR) labels, which identify multiple different levels of language proficiency: A1—Beginner, A2—Elementary, B1—Intermediate, B2—Upper Intermediate, C1—Advanced, C2—Proficient. Examples of error codes include the Cambridge Learner Corpus error codes. There are at the time of this disclosure approximately 80 different CLC error codes, including, for example: #AG agreement error, #FJ wrong adjective form, #ID idiom wrong, #MV missing verb, #SA spelling American, #TV incorrect tense of verb, #UN unnecessary noun, #W word order error, etc. These examples of training data are provided for illustration purposes only and other forms and sources of training data may be used in other embodiments.

Model testing instructions 138 are embodied as computer programming code stored in computer memory that when executed cause a computing device to evaluate particular iterations of adapted model 134 by inputting particular sets of test data into adapted model 134. To evaluate the performance of an adapted model 134, model testing instructions 138 when executed by a computing device may use portions of the fine-tuning training data set that have been reserved for testing of adapted model 134.

The test data selected for a model evaluation may come from the same domain as the training data used to train the model being evaluated. For example, if a model has been adapted using English-language training data sourced from native-Chinese speakers, that model may be evaluated using English-language test data sourced from native-Chinese speakers. In an embodiment, performance of adapted model 134 is compared to performance of a baseline model that has been created by adapting a general purpose GEC system to a random sample of CLC data, and is also compared to performance of models adapted for L1 only and proficiency level only.

Figure 4B:
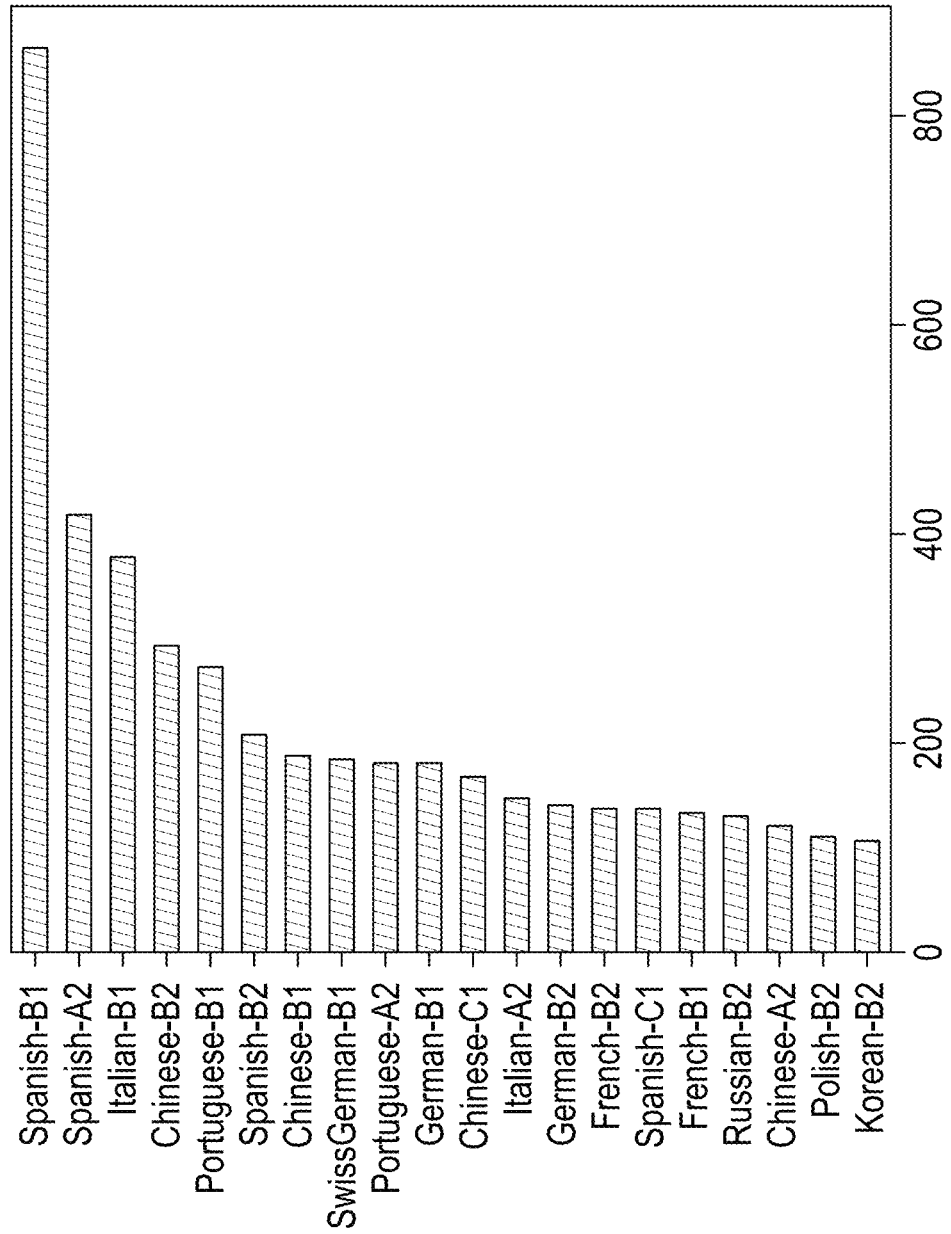
FIG. 4B is an example of a distribution of training data that may be used to create a model, in an embodiment of the computing system of FIG. 1.

Reference data store 150 is, in an embodiment, at least one digital data store that stores data sets used to train, test, and tune model 134. In an embodiment, reference data store 150 includes a domain-independent set of training data used to train model 134 and an in-domain set of training data used to fine-tune model 134. An example distribution of in-domain training data is shown in FIG. 4B, described below. Reference data store 150 may also store results of model testing, such as precision, recall, and $M^2$ metrics.

Each of user system 110, GEC system 130, and reference data store 150 is implemented using at least one computing device that is communicatively coupled to electronic communications network 120. User system 110 is configured to communicate bidirectionally with at least GEC system 130, for example over network 120. GEC system 130 is configured to communicate bidirectionally with at least user system 110 and reference data store 150, for example over network 120. Examples of communicative coupling mechanisms include inter-process communication (IPC) interfaces and application program interfaces (APIs).

The features of user system 110, GEC system 130, and reference data store 150 are implemented using computer software, hardware, or software and hardware, and may include combinations of automated functionality, data structures, and digital data, which are represented schematically in FIG. 1. User system 110, GEC system 130, and reference data store 150 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Adapted model 134 and reference data store 150 may each reside on at least one persistent and/or volatile storage devices that may reside within the same local network as at least one other device of computing system 100 and/or in a network that is remote relative to at least one other device of computing system 100. Thus, although depicted as being included in computing system 100, adapted model 134 and/or reference data store 150 may be part of computing system 100 or accessed by computing system 100 over a network, such as network 120.

Logical connection as used in this disclosure may refer to a flow of digital information or data communication that is established between two devices on a network by network software communicating with, for example, the devices' operating systems either directly or by a virtual machine. Examples of protocols that may be used to establish a logical connection include hypertext transfer protocol (HTTP) and secure sockets layer (SSL).

Network 120 may be implemented on any medium or mechanism that provides for the exchange of data, signals, and/or instructions between sub-systems 110, 130, 150 of system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Grammatical Error Correction with Proficiency and Native Language-Adapted Model

Figure 2:
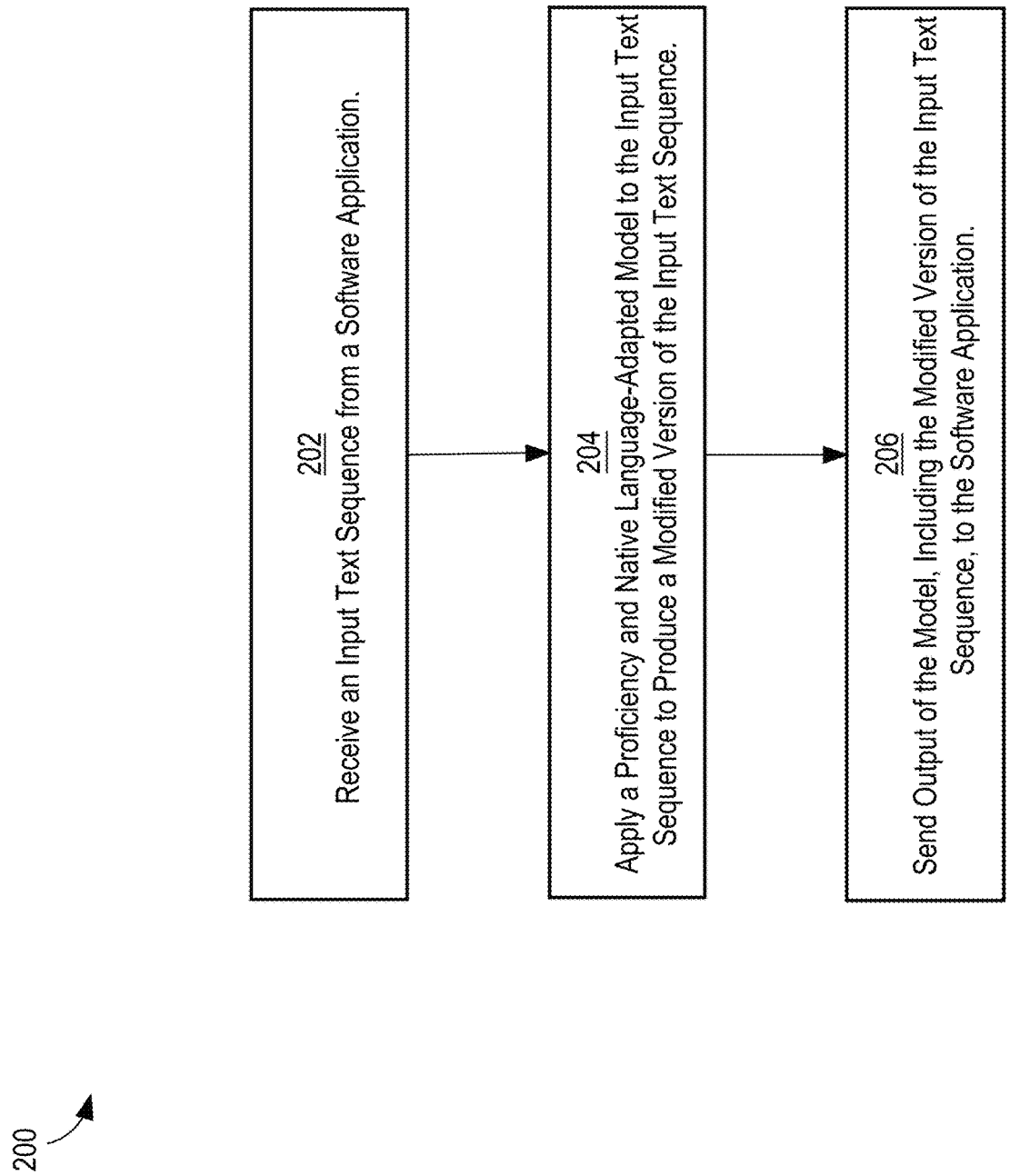
FIG. 2 is a flow diagram of a process that may be executed by at least one device of the computing system of FIG. 1.

FIG. 2 is a simplified flow diagram of an embodiment of operations that can be performed by at least one device of a computing system. The operations of a flow 200 as shown in FIG. 2 can be implemented using processor-executable instructions that are stored in computer memory. For purposes of providing a clear example, the operations of FIG. 2 are described as performed by computing system 100, but other embodiments may use other systems, devices, or implemented techniques.

Operation 202 when executed by at least one processor receives an input text sequence from a software application, such as text communication interface 112 or another software application running on user system 110 or another device. Examples of computer program-based mechanisms by which operation 202 may receive the input text sequence include an HTTP request and an API. An example of an input text sequence is a sentence written in a first language, where the first language may or may not be the native language of the source of the input text sequence. In one example, an input text sequence is written in English by a low-proficiency native English speaker. In another example, an input text sequence is written in English by a high-proficiency native Chinese speaker. In yet another example, an input text sequence is written in German by an intermediate-proficiency native English speaker. Any input text sequence may have any combination of native language and proficiency level.

In some embodiments, operation 202 pre-processes the input text sequence. For example, operation 202 may segment the input text sequence into at least two sub-word units and output the sub-word units, in which case the input text sequence may include a sequence of sub-word units alternatively or in addition to a sequence of words. In an embodiment, operation 202 performs at least one operation of text processing instructions 132, described above. Operation 202 outputs input text sequences for analysis by a digital model, such as adapted model 134, described above.

Operation 204 when executed by at least one processor applies a proficiency and native language-adapted digital model to the input text sequence that has been output by operation 202. In an embodiment, operation 204 causes the input text sequence to be input into the digital model. The digital model with which operation 204 interacts is adapted model 134, in some embodiments.

In an embodiment, values of model parameters of the digital model have been machine-learned using a first data set that includes a set of uncorrected text items and for an uncorrected text item, a corresponding corrected text item, where the set of uncorrected text items includes at least one word produced by a person whose native language is different than the first language. Where the digital model has an encoder and a decoder, values of model parameters associated with the encoder (including an encoding layer or an embedding layer or both the encoding layer and the embedding layer) have been fine-tuned using a second data set. In an embodiment, the second data set includes a set of text sequences and, for a text sequence, a set of features including a proficiency label, and a native language label. In some embodiments, the digital model has been trained by a computing device executing model training instructions 136. In an embodiment, the digital model may be fine-tuned using a data set having the distribution shown in FIG. 4B, described below. In some embodiments, the digital model with which operation 204 interacts may be implemented as digital model 400 shown in FIG. 4A, described below.

In any event, the digital model interacted with by operation 204 analyzes the input text sequence and produces an output text sequence in the same language as the input text sequence received by operation 202. When the input text sequence contains a grammatical and/or fluency-based error, the output text sequence produced by the digital model includes the input text sequence modified by deleting text from the input text sequence or adding text to the input sequence or modifying text of the input text sequence or reordering text of the input text sequence or adding a digital markup to the input text sequence or any combination of any of the foregoing.

When the input text sequence contains a grammatical and/or fluency-based error, the difference between the input text sequence received by operation 202 and the output text sequence produced by the digital model as a result of operation 204 include at least one grammatical and/or fluency correction which have been determined and applied to the input text sequence based on mathematical, for example probabilistic, correlations between proficiency levels and/or native languages, as learned by the digital model through the model training processes described herein. Operation 204 makes the output text sequence produced by the digital model available for use by operation 206. To do this, operation 204 may, for example, call a function that performs operation 206 with the output text sequence as a parameter value.

Operation 206 when executed by at least one processor provides output of the digital model, including the output text sequence, to the software application from which the input text sequence was received in operation 202. In an embodiment, operation 206 forms the output by concatenating or otherwise combining sub-units of text that have been processed by the digital model into a grammatically and fluency-corrected version of the input text sequence. For example, where the input text sequence is an English sentence, operation 206 may form, from output of the digital model, a grammatically and fluency-corrected version of that English sentence, including punctuation and digital markups as indicated by the output of the digital model.

The calling software application of operation 202 may receive the output of operation 206, for example via an API or an HTTP request. The calling software application may cause presentation of the output of operation 206 by, for example, an output device of user system 110. The output device used to present the output of operation 206 may be a device operating, for instance, text communication interface 112. For example, the output of operation 206 may be displayed on a graphical user interface of the calling software application in a text box that is positioned adjacent a text box that contains the input text sequence.

After executing operation 206, flow 200 ends or returns to operation 202 to receive another input text sequence.

Training a Proficiency and Native Language-Adapted Model

Figure 3:
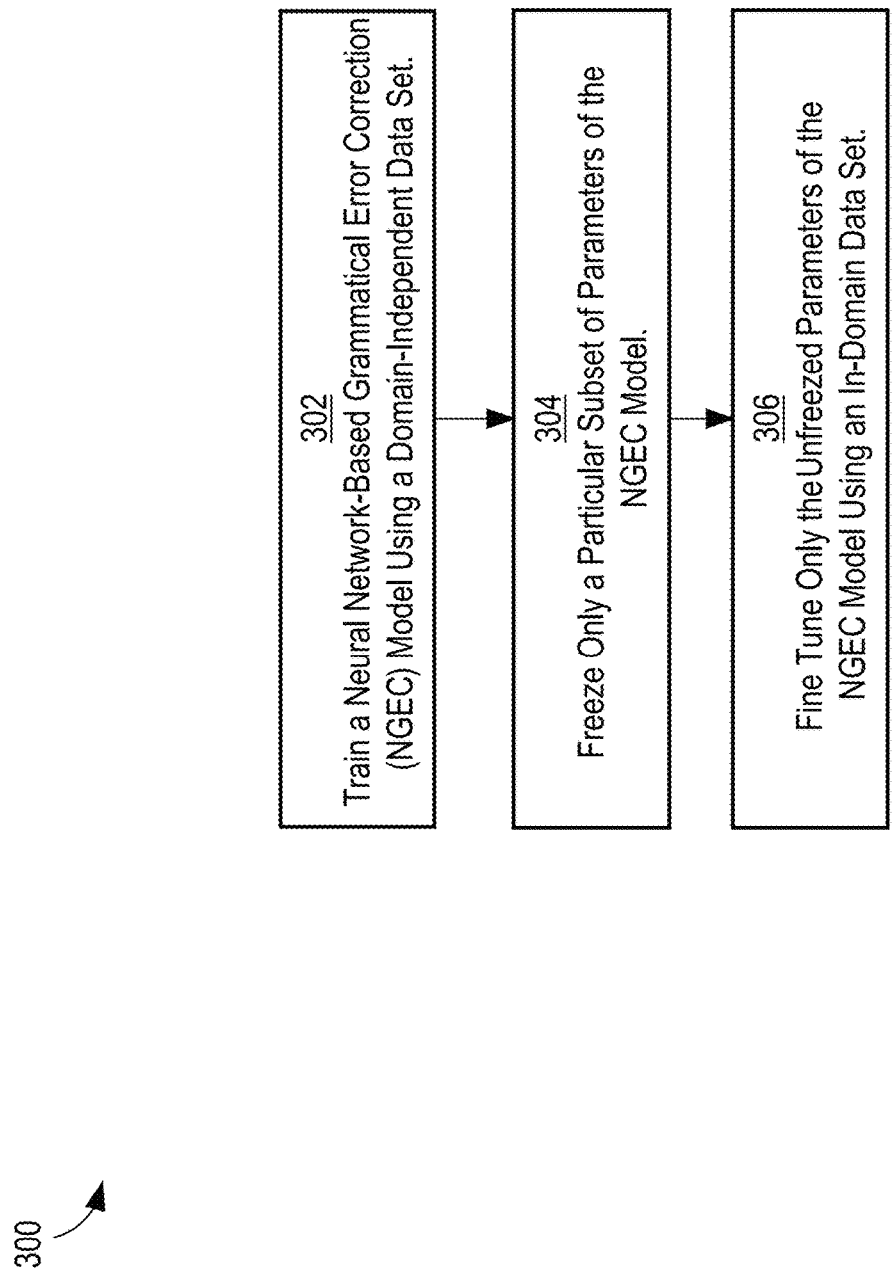
FIG. 3 is a flow diagram of a process that may be executed by at least one device of the computing system of FIG. 1.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems or implemented techniques.

Operation 302 when executed by at least one processor causes a neural network-based grammatical error correction (NGEC) model to be trained using a domain-independent data set. In an embodiment, operation 302 performs a first training step according to model training instructions 136, described above. For instance, a domain-independent corpus, which includes text sequences of a variety of different native languages and proficiency levels but which are not labeled with either the applicable native languages or the applicable proficiency labels, may be used as the domain-independent data set. In an embodiment, a recurrent neural network-based encoder-decoder neural network with an attention mechanism and at least one long term short term memory (LSTM) unit is used to create the NGEC model.

Operation 304 when executed by at least one processor causes only a particular subset of model parameters used by the layers of the NGEC model trained in operation 302 to be frozen. Freeze and frozen as used herein may refer to a computer programming mechanism by which values of certain model parameters are designated as frozen. Thus, the values of the frozen model parameters are set before a subsequent training begins. The values of the frozen model parameters are held static so that they do not change as a result of training of the NGEC model that occurs while the model parameters are frozen.

In an embodiment, values of model parameters of all layers of the NGEC model are designated as frozen, except that the values of the model parameters associated with the encoder, for example the embedding and/or encoding layers, are not frozen. For instance, the model parameter values for the model layers that form the decoder portion of the NGEC model may be frozen after the first training step, in which the NGEC model is trained using the domain-independent data, while the model parameter values for the encoder portion of the NGEC model, for example the embedding and/or encoder layers, may be permitted to change during the fine tuning step of the model training.

Once a particular subset of model parameter values is frozen by operation 304, operation 306 fine tunes only the unfrozen parameter values of the NGEC model using an in-domain training data set. In an embodiment, the parameter values of the model parameters of only the embedding and encoder layers are unfrozen and adjusted during in-domain training by operation 306. Thus, operation 306 when executed by at least one processor causes the NGEC model to be fine-tuned using the in-domain data set. In an embodiment, operation 306 performs the fine tuning step according to the second training step of model training instructions 136, described above. A Cambridge Learner Corpus (CLC), which includes text sequences that have been labeled with native languages and proficiency levels, may be used as the in-domain data set, in an embodiment. In an embodiment, a transfer learning method for neural networks is used in operation 306 to perform the fine tuning.

Implementation Example—Adapted Model

FIG. 4A is a schematic diagram of an arrangement of software-based components that may be stored on at least one device of the computing system of FIG. 1, including examples of inputs and outputs. FIG. 4A shows a portion of a digital model 400, which may be a component of the system of FIG. 1, in an embodiment. Digital model 400 is an artificial neural network implemented using computer programming code and stored digital data. More specifically, digital model 400 is an encoder-decoder recurrent neural network (RNN)-based neural network with an attention mechanism and long term short term memory (LSTM), which is trained using a machine learning technique.

Digital model 400 includes an encoder 402, a decoder 404, and an attention mechanism 406. Encoder 402 includes a set of layers 410, 412. Decoder 404 includes a set of layers 414, 416. Layers 410, 412, 414, 416 are shown as horizontal rows in FIG. 4A. Layers 410, 412, 414, 416 may be considered hidden layers of a deep neural network. Each layer 410, 412, 414, 416 includes a set of memory cells, where each memory cell is represented by a rectangular box in FIG. 4A. A memory cell may be implemented as an LSTM unit, for example.

In FIG. 4A, memory cells are arranged into columns, where each column corresponds to a different time step. Thus, encoder 402 includes two hidden layers and four time steps (each of x(1), x(2), x(3), x(4) represents one unit of the input text sequence and thus one time step of encoder 402), while decoder 404 includes two hidden layers and five time steps. FIG. 4A represents one possible implementation of digital model 400. It will be understood that digital model 400 may include any number of layers and time steps. A time step is represented in FIG. 4A by a positive integer in parentheses. The number of time steps is dependent on the length of the input text sequence and the length of the output text sequence.

In FIG. 4A, the length of the input text sequence is different than the length of the output text sequence. In the example of FIG. 4A, the grammatically and fluency-corrected output text sequence had more words than the input text sequence, which contained at least one grammatical and/or fluency-based error. The length of the output text sequence may depend on the number of errors and/or the types of errors contained in the input text sequence. The input text sequence and the output text sequence are written in the same language, for example, English.

In operation, a memory cell, which also may be referred to as a node, of digital model 400 receives at least one input. The action of receiving at least one input is represented in FIG. 4A by a dashed line having a distal end connected to another memory cell or to a unit of an input text sequence and an arrowhead at a proximal end, which is connected to the memory cell.

A memory cell executes at least one function, which may be referred to as a transfer function or an activation function, on the input and outputs at least one output. For example, a memory cell may execute an algorithm, such as a linear transformation of its inputs followed by sigmoid or tan h function, using a set of model parameters. Another algorithm, such as a SoftMax function, can be applied to the output of the memory cell to predict a text sequence, e.g., a word or a sub-word unit. Examples of parameters include, for a logistic regression algorithm, a weight value W and a bias value b. Model parameter values for W and b may be different at each layer and the parameter values for each layer may be adjusted after each training iteration until the algorithm converges.

A SoftMax function outputs a probability that the input unit x(t) matches a given ground truth y(t), and does this for all words in the ground truth vocabulary. The action of outputting at least one output is represented in FIG. 4A by a dashed line having a proximal end connected to the memory cell and a distal end having an arrowhead that is connected to another memory cell, an attention mechanism 406, or to a unit of a final output text sequence.

The training algorithm executes a loss function, which measures, for a particular training sample, how close the model's prediction is to the ground truth value as defined by the vocabulary. Based on the output of the loss function, an algorithm learns the parameters of all of the layers in both the encoder and decoder.

FIG. 4A illustrates an example of a training phase of digital model 400. Thus, the input text sequence includes both an uncorrected text sequence 418, which includes ordered text units x(1), x(2), x(3), x(4) ("I did checked fridge"), and a corresponding ground-truth corrected text sequence 420, which includes ordered text units y(1), y(2), y(3), y(4), y(5) ("I did check the fridge"). As a result of the training, digital model 400 has learned that "did checked" is an incorrect text sequence and that the corresponding corrected text sequence is "did check the." As a result, digital model 400 outputs a predicted corrected text sequence 422, which includes ordered text units ŷ(1), ŷ(2), ŷ(3), ŷ(4), ŷ(5) ("I did check the fridge"). In FIG. 4A, the units of the input and output text sequences 418, 420, 422 are words, but they could be sub-units in other embodiments, as described above.

In FIG. 4A, boxes 402, 404 are used to illustrate that all layers of both the encoder and the decoder of digital model 400 are trained in a first training step, also known as pre-training, in which digital model 400 is trained using a domain-independent training data set as described above. Box 424 is used to illustrate that only a particular subset of digital model 400; here, the layers of encoder 402, are fine-tuned in a second training step using in-domain data as described above.

During model training, encoder 402 learns an embedding for a text sequence at each time step. During the first training step, the embeddings are learned using a domain-independent training data. During the second training step, the embeddings are fine-tuned using the in-domain training data. To learn embeddings, encoder 402 may initialize the parameters using a random function or using parameters output by another algorithm, such as word2vec.

During the training process, all of the parameters are updated for each output time step y(t). Therefore, information from all of y(1), y(2), y(3), y(4), y(5) is used to learn all the parameters of encoder 402 (the embedding of the input sequence) and decoder 404.

Embedding as used herein may refer to the process of generating a featurized representation of an input, which may be stored in computer memory as a feature vector. Depending on the features that are used, the feature vector provides information about the input. For example, each dimension of a feature vector for x(1) may indicate semantic and/or syntactic information about the word "I;" for instance, one dimension may indicate information about a meaning of the word "I," another dimension may indicate a position of the word in a sentence, and another dimension may indicate a word that typically precedes or typically follows the word "I" in a sentence.

Attention mechanism 406 is interposed between and operatively couples decoder 404 to encoder 402. Attention mechanism 406 includes an aggregation function, such as concatenation, and a transformation function (not shown), which could be implemented, for example, as a single-layer feedforward neural network. For example, embeddings output by encoder 402 may pass through the attention mechanism 406 before being processed by decoder 404. Attention mechanism 406 aggregates the embeddings for the individual input text units x(1), (2), x(3) and outputs the aggregated embeddings to memory cells of decoder 404. This process is illustrated in FIG. 4A by the arrows that connect memory cells of attention mechanism 406 to memory cells of layers 414, 416 of decoder 404. In this way, attention mechanism 406 enables decoder 404 to consider the encoder output for multiple immediately preceding time steps. Decoder 404 takes the output of encoder 402, attention mechanism 406, as well as previous decoder output and produces, at a particular time step, a unit of the output text sequence.

During model training, the input text sequence is a training sequence that includes both an uncorrected text sequence and a corrected text sequence, as described above. During live operation, once digital model 400 has been trained and is being used for automated grammatical error correction, the input text sequence includes an uncorrected text sequence received, for instance, via a graphical user interface. However, the input text sequence does not include a corrected text sequence because the trained digital model 400 predicts and outputs the corrected text sequence (y^(t)), based on its analysis and classification of text units of the input uncorrected text sequence, in accordance with its training.

Hyperparameters are model parameters that are set as part of the model design. During model training, the values of the hyperparameters influence the values of the model parameters, for example W and b, at each layer. In an embodiment, values of certain hyperparameters of digital model 400 are set for the first training phase, or pre-training, in which domain-independent training data is used, and are set differently for the second training phase, or fine tuning, in which in-domain training data is used. In an embodiment, hyperparameters that have different values for the first and second training phases include the number of epochs (where an epoch represents one training cycle through a data set), batch_size (the size of a subset of a training data set to be used for subsequent training), learning_rate (indicates how much the model is to change in response to predicted or estimated error at a particular training step), and start_decay_at (indicates when to start decay of weight values, where decay refers to a process of multiplying the learning_rate value by a value less than 1 so that it eventually decays to zero, for example to prevent overfitting). For example, in an embodiment, the epochs and start_decay_at parameter values for the second training phase are larger than for the first training phase, but the parameter values for batch_size and learning_rate are smaller for the second training phase than for the first training phase.

In general, model as used herein may refer to a combination of computer programming code in which at least one decision-making algorithm is expressed; i.e., a machine learning algorithm, and at least one computer-implemented data structure that stores data and/or parameters used by the model.

Examples of Training Data

FIG. 4B is an example of a distribution of training data 450 that may be used to create a model, in an embodiment of the computing system of FIG. 1. In FIG. 4B, the x axis indicates the number of text sequences and the y axis indicates the native language-proficiency level combinations. Thus, in the example of FIG. 4B, the training data set approximately 800 input text sequences with a native language Spanish, proficiency level B1 source and approximately 100 input text sequences with a native language Korean, proficiency level B2 source. Proficiency level as used herein may refer to the proficiency level in the language of the input text sequence. Thus, if the input text sequence is in English, a native language-proficiency level pair of Korean-B2 indicates that the source of the input text sequences had a native language of Korean and a proficiency level in English of B2.

Examples of Experimental Results

Examples of grammatical and fluency-based corrections that have been made in experiments conducted using the disclosed technologies are shown in Table 1 below.

TABLE 1

| Examples of Model-Based Corrections Based on L1 and Proficiency Level. | |
|---|---|
| Orig | He told me that celebrity can be bad because he can't do shopping normally. |
| Rand | He told me that the celebrity can be bad because he can't do shopping normally. |
| FR-B1 | He told me that celebrity can be bad because be can't go shopping normally. |
| Ref | He told me that celebrity can be bad because he can't go shopping normally. |

In Table 1, "Orig" refers to the original text input received from a native-French speaking source, "Rand" refers to the output produced by a "Random" model, which has been adapted to non-native writing but has not been specifically adapted to L1 or proficiency level (for example, a Random model may be learned by using a random sample of the CLC corpus in the second training step described above), "FR-B1" refers to output produced by a model that has been adapted for native language and proficiency level using training data for native language French and proficiency level B1, and "Ref" refers to the ground-truth correct version of the original input.

In the example of Table 1, the native-French speaker incorrectly said, "do shopping," most likely because the verb phrase corresponding to "go shopping" in French is "faire des achats," where the verb "faire" translates as "to make or to do." The FR-B1 model was able to identify the confused auxiliary verb error and appropriately make the correction, while the random model did not detect the confused auxiliary verb error and produced a sentence with a different meaning.

Examples of performance results that have been achieved in experiments are shown in Table 2 below.

TABLE 2

Comparison of Model Performance.

| | Chinese-B2 | | | Chinese-C1 | | | French-B1 | | |
|---|---|---|---|---|---|---|---|---|---|
| | P | R | F0.5 | P | R | F0.5 | P | R | F0.5 |
| None | 41.4 | 23.9 | 36.1 | 39.9 | 18.6 | 32.5 | 36.4 | 21.0 | 31.8 |
| Random | 51.2 | 25.6 | 42.7 | 49.9 | 20.9 | 39.1 | 54.8 | 26.7 | 45.3 |
| Adapted Level | 51.9 | 26.1 | 43.4 | 52.2 | 22.0 | 41.0 | 55.7 | 27.9 | 46.5 |
| Adapted L1 | 52.1 | 27.4 | 44.1 | 51.3 | 22.6 | 40.9 | 56.4 | 27.2 | 46.5 |
| Adapted L1 & Level | 53.5 | 28.4 | 45.5 | 52.9 | 24.8 | 43.1 | 57.6 | 29.0 | 48.1 |

| | German-B1 | | | Italian-B1 | | | Portuguese-B1 | | |
|---|---|---|---|---|---|---|---|---|---|
| | P | R | F0.5 | P | R | F0.5 | P | R | F0.5 |
| None | 35.3 | 21.2 | 31.2 | 32.1 | 18.8 | 28.1 | 36.2 | 20.6 | 31.4 |
| Random | 56.5 | 26.5 | 46.1 | 54.7 | 24.0 | 43.5 | 55.1 | 26.2 | 45.2 |
| Adapted Level | 57.0 | 27.4 | 46.9 | 56.4 | 25.3 | 45.3 | 56.0 | 27.0 | 46.1 |
| Adapted L1 | 59.2 | 27.5 | 48.1 | 58.6 | 25.5 | 46.5 | 55.2 | 28.0 | 46.2 |
| Adapted L1 & Level | 60.9 | 29.5 | 50.2 | 58.6 | 26.6 | 47.3 | 57.5 | 28.7 | 47.9 |

| | Spanish-A2 | | | Spanish-B1 | | | Spanish-B2 | | |
|---|---|---|---|---|---|---|---|---|---|
| | P | R | F0.5 | P | R | F0.5 | P | R | F0.5 |
| None | 32.8 | 19.7 | 28.9 | 35.8 | 22.1 | 31.9 | 38.9 | 22.1 | 33.7 |
| Random | 58.7 | 31.8 | 50.2 | 55.6 | 27.9 | 46.4 | 54.4 | 25.1 | 44.1 |
| Adapted Level | 62.7 | 40.8 | 56.6 | 56.8 | 28.8 | 47.5 | 54.0 | 24.8 | 43.7 |
| Adapted L1 | 61.3 | 36.1 | 53.8 | 56.4 | 29.2 | 47.6 | 54.4 | 25.6 | 44.4 |
| Adapted L1 & level | 63.7 | 43.2 | 58.2 | 57.5 | 30.3 | 48.8 | 56.0 | 26.1 | 45.6 |

Table 2 shows performance metrics P (precision), R (recall) and F0.5 ($M^2$) that were computed for various native language-proficiency level combinations on which each of several models were tested. Table 2 shows that a model adapted to both native language and proficiency level using the disclosed techniques outperformed the random model, a model adapted to proficiency level only, and a model adapted to native language only, in these evaluations.

Table 3 below shows the relative improvements in $F_{0.5}$ of the L1-proficiency level model over the random model broken down by error code.

TABLE 3

Model Improvements by Error Code.

| Adapt | Det | Prep | Verb | Tense | NNum | Noun | Pron |
|---|---|---|---|---|---|---|---|
| CN-C1 | 3.53 | 5.90 | 2.99 | 1.77 | 8.28 | 8.02 | 22.78 |
| FR-B1 | 2.34 | 1.99 | 12.54 | 5.16 | 9.16 | 3.48 | 1.13 |
| DE-B1 | 8.85 | 1.77 | 2.04 | 2.37 | 3.86 | 7.18 | 22.75 |
| IT-B1 | 2.37 | 5.32 | 12.48 | 6.74 | 4.40 | 3.29 | 8.99 |
| ES-A2 | 6.06 | 12.52 | 7.51 | 8.54 | 8.73 | 12.39 | 10.57 |

Table 3 shows that a model adapted to proficiency level and native language using the disclosed techniques outperformed the random model on most types of errors, as indicated by a positive value, where a higher value indicates greater improvement. For instance, a Chinese-C1 adapted model as disclosed herein achieved the largest improvement over the random model on pronoun (Pron) and noun number agreement (NNum) errors, while a Spanish-A2 adapted model achieved the largest improvement over the random model on preposition (Prep), noun and pronoun errors. Both the French-B1 and Italian-B1 adapted models improved the most, over the random model, on verb errors, while the German-B1 adapted model improved the most, over the random model, on pronoun (Pron) and determiner (Det) errors. These results illustrate how the disclosed adapted model can provide GEC improvements that are particularized or personalized based on the native language and proficiency level of the source of the input.

Implementation Example—Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 5:
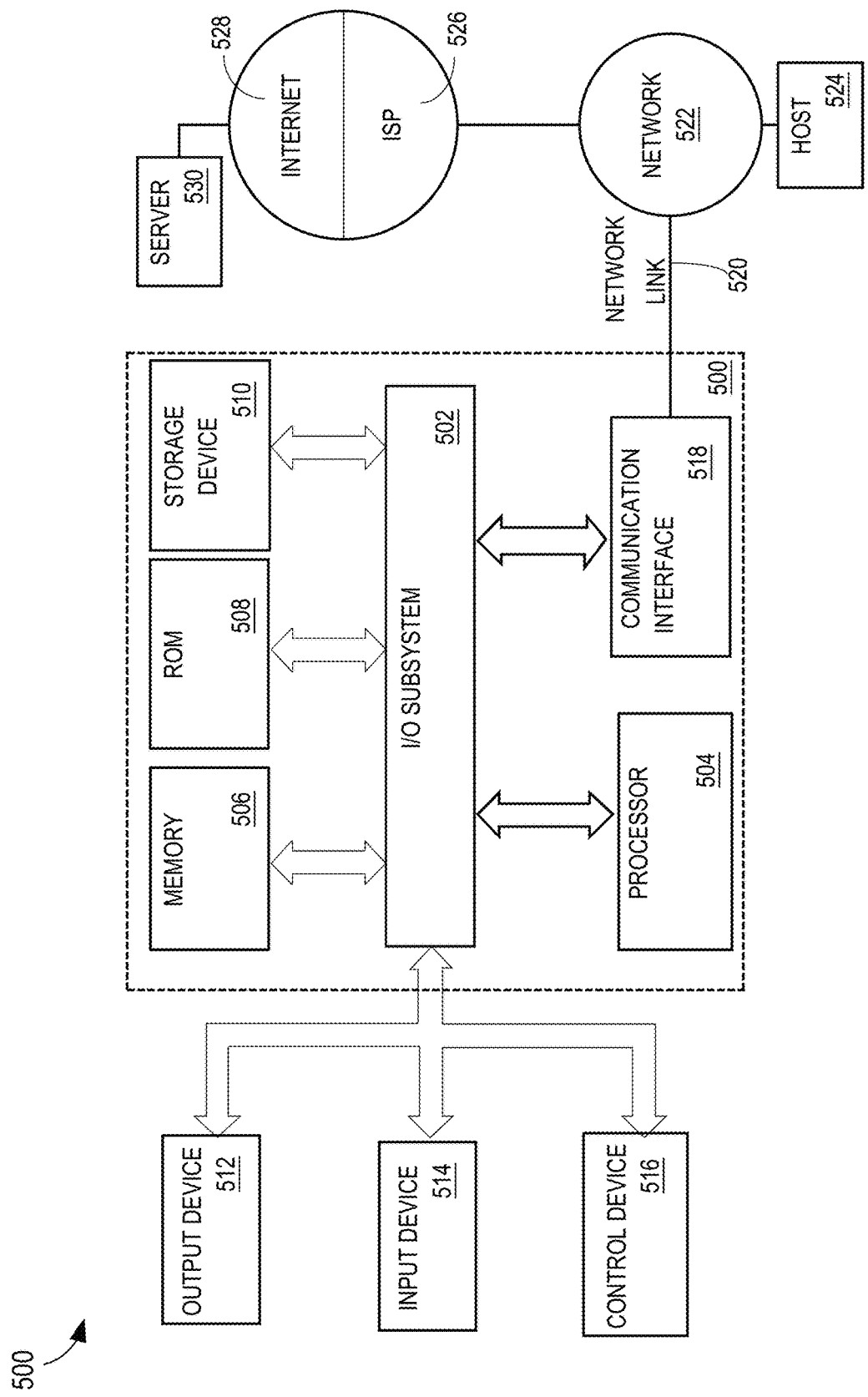
FIG. 5 is a block diagram illustrating an embodiment of a hardware system, which may be used to implement various aspects of the computing system of FIG. 1

For example, FIG. 5 is a block diagram that illustrates a computer system 500 upon which an embodiment of the present invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 and further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, at least one ASIC or FPGA, firmware and/or program logic which in combination with the computer system causes or programs computer system 500 to be a special-purpose machine. According to one embodiment, the techniques herein are performed by computer system 500 in response to processor 504 executing at least one sequence of instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying at least one sequence of instruction to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through at least one network to other data devices. For example, network link 520 may provide a connection through local network 522 to a host computer 524 or to data equipment operated by an Internet Service Provider (ISP) 526. ISP 526 in turn provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes receiving under digital program control, by a digital model, electronic digital data representing a first text sequence in a first language; the digital model having been machine-learned using a first dataset that comprises a set of text sequences and, for a text sequence, a set of corresponding features, the set of corresponding features includes a proficiency label and a native language label, and a second dataset that comprises a set of uncorrected text items and for an uncorrected text item, a corresponding corrected text item; the digital model includes a plurality of artificial neural network layers and model parameters associated with the artificial neural network layers, a value of a particular model parameter indicative of a relationship between a native language label, a proficiency label, or a proficiency label-native language label combination, and a text sequence, and a corrected text item; the digital model having been fine-tuned, after having been machine-learned, using a subset of the values of the model parameters associated with an encoding layer or an embedding layer or both the encoding layer and the embedding layer; using the digital model, modifying the first text sequence to result in creating and digitally storing a second text sequence in the first language, the modifying includes any one or more of: deleting text from the first text sequence; adding text to the first text sequence; modifying text of the first text sequence; reordering text of the first text sequence; adding a digital markup to the first text sequence; outputting, by the digital model, the second text sequence in the first language.

An example 2 includes the subject matter of example 1, and further includes receiving, from a graphical user interface, text input that includes the first text sequence, and outputting, to the graphical user interface, text output that includes the second text sequence. An example 3 includes the subject matter of example 2, and further includes creating the first text sequence by segmenting the text input into at least two sub-word units. An example 4 includes the subject matter of any of examples 1-3, and further includes creating the set of text sequences, the set of uncorrected text items, and the corresponding corrected text items in the first language. An example 5 includes the subject matter of any of examples 1-4, and further includes creating the proficiency label using a stored digital value of a Common European Framework of Reference for Languages (CEFR) proficiency level value. An example 6 includes the subject matter of any of examples 1-5, and further includes creating the native language label using a stored digital value that identifies a native language associated with a spoken text sequence of the set of text sequences. An example 7 includes the subject matter of any of examples 1-6, and further includes using, as the first language, a language includes words usable for human-to-human communication.

In an example 8, a method for training a grammatical error correction model includes: inputting, to a digital model, a first dataset that comprises a set of text sequences and, for a text sequence, a set of corresponding features, the set of corresponding features includes a proficiency label and a native language label, and a second dataset that comprises a set of uncorrected text items and for an uncorrected text item, a corresponding corrected text item; the digital model includes a plurality of artificial neural network layers and model parameters associated with the artificial neural network layers, a value of a model parameter indicative of a relationship between a native language label, a proficiency label, or a proficiency label-native language label combination, and a text sequence, and a corrected text item; and fine-tuning the digital model using a subset of the values of the model parameters associated with an encoding layer or an embedding layer or both the encoding layer and the embedding layer.

An example 9 includes the subject matter of example 8, and further includes creating a text sequence of the set of text sequences by segmenting text of the text sequence into at least two sub-word units. An example 10 includes the subject matter of example 8 or example 9, and further includes creating the digital model using a recurrent neural network. An example 11 includes the subject matter of any of examples 8-10, and further includes creating the digital model using an attention mechanism. An example 12 includes the subject matter of any of examples 8-11, and further includes creating the digital model using at least one long term short term memory (LSTM). An example 13 includes the subject matter of any of examples 8-12, and further includes fine-tuning the digital model using a transfer learning method for neural networks.

In an example 14, a method includes receiving, by a digital model, an input text sequence in a first language; the digital model machine-learned using a first data set that comprises a set of uncorrected text sequences and for an uncorrected text sequence, a corresponding corrected text sequence, the set of uncorrected text sequences includes at least one word produced by a person whose native language is different than the first language; values of model parameters associated with only a portion of the digital model fine-tuned after being machine-learned using the first data set, the portion of the digital model fine-tuned using a second data set that comprises a set of text sequences and, for a text sequence, a set of corresponding features includes a proficiency label and a native language label, and outputting, by the digital model, an output text sequence in the first language, the output text sequence includes the input text sequence modified by any one or more of: deleting text from the input text sequence; adding text to the input text sequence; modifying text of the input text sequence; reordering text of the input text sequence; adding a digital markup to the input text sequence.

An example 15 includes the subject matter of example 14, and further includes fine tuning only an encoding layer or only an embedding layer or only both the encoding layer and the embedding layer of the digital model. An example 16 includes the subject matter of example 14 or example 15, and further includes receiving, from a graphical user interface, text input includes the input text sequence, and outputting, to the graphical user interface, text output includes the output text sequence. An example 17 includes the subject matter of any of examples 14-16, and further includes creating the input text sequence by segmenting the text input into at least two sub-word units. An example 18 includes the subject matter of any of examples 14-17, and further includes using, as the proficiency label, a digital value that corresponds to a Common European Framework of Reference for Languages (CEFR) proficiency level. An example 19 includes the subject matter of any of examples 14-18, and further includes using, as the native language label, a digital value that corresponds to a native language of a speaker associated with a text sequence of the set of text sequences. An example 20 includes the subject matter of any of examples 14-19, and further includes using, as the first language, a language that comprises words usable for human-to-human communication.

In an example 21, a method includes receiving, by a digital model, an input text sequence in a first language; model parameters of the digital model machine-learned using a first data set that comprises a set of uncorrected text sequences and for an uncorrected text sequence, a corresponding corrected text sequence, the set of uncorrected text sequences includes at least one word produced by a person whose native language is different than the first language; values of model parameters associated with an encoding layer or an embedding layer or both the encoding layer and the embedding layer of the digital model fine-tuned after being machine-learned using a second data set that comprises a set of text sequences and, for a text sequence, a set of corresponding features includes a proficiency label, a native language label, and an error label, and outputting, by the digital model, an output text sequence in the first language, the output text sequence includes the input text sequence modified by i) deleting text from the input text sequence or ii) adding text to the input text sequence or iii) modifying text of the input text sequence or iv) reordering text of the input text sequence or v) adding a digital markup to the input text sequence or vi) any combination of any of i), ii), iii), iv), v).

An example 22 includes the subject matter of example 21, and further includes sequences of instructions which when executed cause receiving, from a graphical user interface, text input includes the input text sequence, and outputting, to the graphical user interface, text output includes the output text sequence. An example 23 includes the subject matter of example 22, and further includes sequences of instructions which when executed cause creating the input text sequence by segmenting the text input into at least two sub-word units.

An example 24 includes the subject matter of any of examples 21-23, where the set of text sequences, the set of uncorrected text sequences, and the corresponding corrected text sequence are in the first language. An example 25 includes the subject matter of any of examples 21-24, where the proficiency label corresponds to a Common European Framework of Reference for Languages (CEFR) proficiency level. An example 26 includes the subject matter of any of examples 21-25, where the native language label corresponds to a native language of a speaker associated with a text sequence of the set of text sequences. An example 27 includes the subject matter of any of examples 21-28, where the first language comprises words usable for human-to-human communication.

In an example 28, a method for training a grammatical error correction (GEC) model includes training a digital model using a first data set that comprises a set of uncorrected text sequences and for an uncorrected text sequence, a corresponding corrected text sequence; and fine tuning values of model parameters associated with an encoding layer or an embedding layer or both the encoding layer and the embedding layer of the digital model after having been trained using the first data set, the fine tuning using a second data set that comprises a set of text sequences and, for a text sequence, a set of corresponding features includes a proficiency label, a native language label, and an error label; the digital model includes neural network layers and model parameters associated with the neural network layers, a value of a model parameter indicative of a relationship between a native language label, a proficiency label, or a proficiency label-native language label combination, and a text sequence, an error label, and a corrected text sequence.

An example 29 includes the subject matter of example 28, where the set of uncorrected text sequences comprises at least one word produced by a user whose native language is different than a language of the at least one word. An example 30 includes the subject matter of example 28 or example 29, and further includes creating a text sequence of the set of text sequences by segmenting text of the text sequence into at least two sub-word units. An example 31 includes the subject matter of any of examples 28-30, and further includes creating the digital model using a recurrent neural network. An example 32 includes the subject matter of any of examples 28-31, and further includes creating the digital model using an attention mechanism interposed between an encoder and a decoder. An example 33 includes the subject matter of any of examples 28-32, and further includes fine-tuning the digital model using a transfer learning method configured for neural networks.

In an example 34, at least one non-transitory digital data storage medium storing sequences of executable program instructions which when executed by at least one processor cause the at least one processor to perform operations comprising: receiving, by a digital model, an input text sequence in a first language; the digital model machine-learned using a first data set that comprises a set of uncorrected text sequences and for an uncorrected text sequence, a corresponding corrected text sequence, the set of uncorrected text sequences includes at least one word produced by a person whose native language is different than the first language; values of model parameters associated with only a portion of the digital model fine-tuned after being machine-learned using the first data set, the portion of the digital model fine-tuned using a second data set that comprises a set of text sequences and, for a text sequence, a set of corresponding features includes a proficiency label, a native language label, and an error label, and outputting, by the digital model, an output text sequence in the first language, the output text sequence includes the input text sequence modified by i) deleting text from the input text sequence or ii) adding text to the input text sequence or iii) modifying text of the input text sequence or iv) reordering text of the input text sequence or v) adding a digital markup to the input text sequence or vi) any combination of any of i), ii), iii), iv), v).

An example 35 includes the subject matter of example 34, and further includes sequences of instructions which when executed cause only an encoding layer or only an embedding layer or only both the encoding layer and the embedding layer of the digital model to be fine-tuned. An example 36 includes the subject matter of example 34 or example 35, and further includes sequences of instructions which when executed cause receiving, from a graphical user interface, text input includes the input text sequence, and outputting, to the graphical user interface, text output includes the output text sequence. An example 37 includes the subject matter of any of examples 34-36, and further includes sequences of instructions which when executed cause creating the input text sequence by segmenting the text input into at least two sub-word units. An example 38 includes the subject matter of any of examples 37, where the proficiency label corresponds to a Common European Framework of Reference for Languages (CEFR) proficiency level. An example 39. includes the subject matter of any of examples 34-38, where the native language label corresponds to a native language of a speaker associated with a text sequence of the set of text sequences. An example 40 includes the subject matter of any of examples 34-39, where the first language comprises words usable for human-to-human communication.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method comprising:
    receiving under digital program control, by a digital model, electronic digital data representing a first text sequence in a first language, wherein the digital model comprises a fluency-adjusted grammatical error correction model;
    generating, by the fluency-adjusted grammatical error correction model, a second text sequence in the first language which is grammatically corrected and fluency adjusted, wherein the fluency-adjusted grammatical error correction model is trained by:
        training the fluency-adjusted grammatical error correction model using domain-independent training data that comprises a set of uncorrected text items and for each uncorrected text item, a corresponding corrected text item, wherein the domain-independent training data comprises text sequences relating to a plurality of different topics and writing styles received from native and non-native speakers of various native backgrounds, the fluency-adjusted grammatical error correction model comprising a plurality of artificial neural network layers and model parameters associated with artificial neural network layers;
        training the fluency-adjusted grammatical error correction model using in-domain training data, wherein the training the fluency-adjusted grammatical error correction model using in-domain training data adjusts only a subset of values of the model parameters associated with an encoding layer or an embedding layer or both the encoding layer and the embedding layer, the in-domain training data comprising a set of text sequences and, for each text sequence, a set of corresponding features, the set of corresponding features comprising a proficiency label and a native language label; and
    outputting, by the digital model, the second text sequence in the first language.

2. The method of claim 1, further comprising creating the set of text sequences, the set of uncorrected text items, and corresponding corrected text items in the first language.

3. The method of claim 1, further comprising creating the proficiency label using a stored digital value of a Common European Framework of Reference for Languages (CEFR) proficiency level value.

4. The method of claim 1, further comprising creating the native language label using a stored digital value that identifies a native language associated with a spoken text sequence of the set of text sequences.

5. The method of claim 1, further comprising using, as the first language, a language comprising words usable for human-to-human communication.

6. The method of claim 1, further comprising receiving, from a graphical user interface, text input comprising the first text sequence, and outputting, to the graphical user interface, text output comprising the second text sequence.

7. The method of claim 6, further comprising creating the first text sequence by segmenting the text input into at least two sub-word units.

8. A method for training a fluency-adjusted grammatical error correction model, the method comprising:
    training the fluency-adjusted grammatical error correction model using a first dataset from text sequences relating to a plurality of different topics and writing styles received from native and non-native speakers of various native backgrounds, the first dataset comprising domain-independent training data that comprises a set of uncorrected text items and for each uncorrected text item, a corresponding corrected text item, the fluency-adjusted grammatical error correction model comprising a plurality of artificial neural network layers and model parameters associated with the plurality of artificial neural network layers; and
    training on the fluency-adjusted grammatical error correction model using a second dataset, the second dataset comprising in-domain training data that comprises a set of text sequences and, for each text sequence, a set of corresponding features, the set of corresponding features comprising a proficiency label and a native language label, wherein the training on the fluency-adjusted grammatical error correction model using a second dataset adjusts only a subset of values of the model parameters associated with an encoding layer or an embedding layer or both the encoding layer and the embedding layer.

9. The method of claim 8, further comprising creating, for each text sequence, a text sequence of the set of text sequences by segmenting text of the text sequence into at least two sub-word units.

10. The method of claim 8, further comprising creating the fluency-adjusted grammatical error correction model using a recurrent neural network.

11. The method of claim 8, further comprising creating the fluency-adjusted grammatical error correction model using an encoder-decoder neural network with an attention mechanism and at least one long term short term memory (LSTM) unit.

12. The method of claim 8, wherein at least one type of error is present in the text sequences and location of the error within the text sequences for the in-domain training data.

13. The method of claim 8, further comprising fine-tuning the fluency-adjusted grammatical error correction model using a transfer learning method for neural networks.

14. A method, comprising:
- receiving, by a digital model, an input text sequence in a first language, wherein the digital model comprises a fluency-adjusted grammatical error correction model;
- generating, by the fluency-adjusted grammatical error correction model, an output text sequence in the first language which is grammatically corrected and fluency adjusted, wherein the fluency-adjusted grammatical error correction model is trained by:
  - training the fluency-adjusted grammatical error correction model using a first data set that comprises a set of uncorrected text sequences and for each uncorrected text sequence, a corresponding corrected text sequence, wherein the first data set comprises text sequences relating to a plurality of different topics and writing styles received from native and non-native speakers of various native backgrounds, the set of uncorrected text sequences comprising at least one word produced by a person whose first native language is different from the first language; and
  - training the fluency-adjusted grammatical error correction model using an in-domain training data set, wherein the training the fluency-adjusted grammatical error correction model adjusts values of model parameters associated with only a subset of the digital model after being trained using the first data set, the in-domain training data set comprising a set of text sequences and, for each text sequence, a set of corresponding features comprising a proficiency label and a native language label wherein at least one type of error is present in a first text sequence and location of the error within the first text sequence for the in-domain training data set;
- generating, by the digital model, the output text sequence in the first language, the output text sequence comprising the input text sequence modified for grammatical correction and fluency adjustment of the first text sequence based on a particular native language and proficiency level; and
- outputting, by the digital model, the output text sequence in the first language.

15. The method of claim 14, further comprising fine tuning only an encoding layer or only an embedding layer or only both the encoding layer and the embedding layer of the digital model.

16. The method of claim 14, further comprising using, as the proficiency label, a digital value that corresponds to a Common European Framework of Reference for Languages (CEFR) proficiency level.

17. The method of claim 14, further comprising using, as the native language label, a digital value that corresponds to a second native language of a speaker associated with a text sequence of the set of text sequences.

18. The method of claim 14, further comprising using, as the first language, a language that comprises words usable for human-to-human communication.

19. The method of claim 14, further comprising receiving, from a graphical user interface, text input comprising the input text sequence, and outputting, to the graphical user interface, text output comprising the output text sequence.

20. The method of claim 19, further comprising creating the input text sequence by segmenting the text input into at least two sub-word units.

* * * * *